United States Patent
Kumar et al.

(10) Patent No.: US 10,444,537 B2
(45) Date of Patent: Oct. 15, 2019

(54) OPTICAL ARTICLE HAVING A PHOTOLUMINESCENT MARK

(71) Applicant: Transitions Optical, Inc., Pinellas Park, FL (US)

(72) Inventors: Anil Kumar, Murrysville, PA (US); Chenguang Li, Saint Petersburg, FL (US); William D. Carpenter, Pinellas Park, FL (US); Jennine M. Frease, Saint Petersburg, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 99 days.

(21) Appl. No.: 15/544,615

(22) PCT Filed: Jan. 22, 2015

(86) PCT No.: PCT/US2015/012353
§ 371 (c)(1),
(2) Date: Jul. 19, 2017

(87) PCT Pub. No.: WO2016/118130
PCT Pub. Date: Jul. 28, 2016

(65) Prior Publication Data
US 2018/0024377 A1    Jan. 25, 2018

(51) Int. Cl.
*G02C 7/02* (2006.01)
*B29D 11/00* (2006.01)
(Continued)

(52) U.S. Cl.
CPC ........ *G02C 7/021* (2013.01); *B29D 11/00317* (2013.01); *B41M 3/003* (2013.01);
(Continued)

(58) Field of Classification Search
CPC .......... G02C 7/02; G02C 7/021; G02C 7/102; G02B 1/12; G02B 1/04; G02B 5/23;
(Continued)

(56) References Cited

U.S. PATENT DOCUMENTS

| 4,190,621 A | 2/1980 | Greshes |
| 4,279,401 A | 7/1981 | Ramirez et al. |

(Continued)

FOREIGN PATENT DOCUMENTS

| DE | 102006035655 A1 | 2/2008 |
| WO | 9420581 A1 | 9/1994 |
| WO | 2007005354 A2 | 1/2007 |

*Primary Examiner* — William R Alexander
*Assistant Examiner* — Henry A Duong
(74) *Attorney, Agent, or Firm* — The Webb Law Firm

(57) ABSTRACT

The present invention relates to an optical article that includes, a mark that is positioned on and/or within the first surface of an optical substrate thereof, and a photochromic layer that includes at least one photochromic compound and which resides over at least a portion of the first surface. The mark includes a photoluminescent material. The first surface of the optical substrate is exposed to a source of actinic radiation, the photochromic compound has an activation time after exposure to the source of actinic radiation, and the mark luminesces and is visually observable during at least a portion of the activation time. The present invention also relates to: an optical article that includes, a mark that is positioned within the first surface of an optical substrate thereof, and at least one photochromic compound that is also positioned within the first surface; and methods of making such optical articles.

20 Claims, 6 Drawing Sheets

(51) Int. Cl.
*B41M 3/00* (2006.01)
*G02C 7/10* (2006.01)
*G07D 7/00* (2016.01)
*C09K 11/61* (2006.01)
*G02B 1/04* (2006.01)
*G02B 1/12* (2006.01)
*G02B 5/23* (2006.01)
*G07D 7/202* (2016.01)
*G07D 7/1205* (2016.01)

(52) U.S. Cl.
CPC ............... C09K 11/61 (2013.01); G02B 1/04 (2013.01); G02B 1/12 (2013.01); G02B 5/23 (2013.01); G02C 7/102 (2013.01); G07D 7/003 (2017.05); G07D 7/1205 (2017.05); G07D 7/205 (2013.01)

(58) Field of Classification Search
CPC .. C09K 11/61; B29D 11/00317; B41M 3/003; G07D 7/003; G07D 7/1205; G07D 7/205
USPC ...................................................... 351/159.69
See application file for complete search history.

(56) References Cited

U.S. PATENT DOCUMENTS

| | | |
|---|---|---|
| 4,731,264 A | 3/1988 | Lin et al. |
| 4,756,973 A | 7/1988 | Sakagami et al. |
| 4,836,960 A | 6/1989 | Spector et al. |
| 5,134,191 A | 7/1992 | Takarada et al. |
| 5,231,156 A | 7/1993 | Lin |
| 5,399,451 A | 3/1995 | Hashida et al. |
| 5,462,806 A | 10/1995 | Konishi et al. |
| 5,645,767 A | 7/1997 | Van Gernert |
| 6,175,450 B1 | 1/2001 | Andreani et al. |
| 6,296,785 B1* | 10/2001 | Nelson ............... C07D 311/94 252/586 |
| 6,641,874 B2 | 11/2003 | Kuntz et al. |
| 7,256,921 B2 | 8/2007 | Kumar et al. |
| 8,545,015 B2 | 10/2013 | Kumar et al. |
| 2006/0237541 A1* | 10/2006 | Downing ............ G07D 7/1205 235/462.01 |
| 2011/0264209 A1* | 10/2011 | Wiechmann ............ A61F 2/14 623/6.6 |
| 2013/0163828 A1* | 6/2013 | Seiler ...................... G07D 7/00 382/112 |
| 2014/0197241 A1* | 7/2014 | Lawandy ........... G06K 19/0614 235/488 |

* cited by examiner

OPTICAL ARTICLE HAVING A PHOTOLUMINESCENT MARK

CROSS-REFERENCE TO RELATED APPLICATION

This application is the United States national phase of International Application No. PCT/US2015/012353 filed Jan. 22, 2015, the disclosure of which is hereby incorporated in its entirety by reference.

FIELD

The present invention relates to optical articles, and methods of making such, that include an optical substrate, a photoluminescent mark on and/or within a forward surface of the optical substrate, and (i) a photochromic layer over at least a portion of the forward surface and/or (ii) one or more photochromic compounds present within the forward surface with the photoluminescent mark.

BACKGROUND

With optical elements, such as ophthalmic lenses, one or more marks are often applied to or introduced into a surface of the optical element. Such marks can be used for purposes of, for example, identifying the manufacturer of the optical element, identifying a particular production run that resulted in formation of the optical element, and/or providing information about the optical element, such as optical characteristics (e.g., optical axes, centering points, etc.), the refractive index of the material from which the optical element was fabricated, and/or coatings residing on the optical element, such as antireflective and/or scratch-resistant coatings. Such marks are typically unobservable when the optical element is in normal use, such as being unobservable by a person wearing a pair of ophthalmic lenses that include such a mark or marks. The marks can be rendered observable under certain limited circumstances, such as by exposure to a particular wavelength of light or applied vapor, so as to determine the information contained in the mark. Typically, the marks are of relatively small dimensions. It is often desirable that the mark be a permanent mark, so the information provided thereby can be accessed more than once and/or at a time after formation of the mark.

A method of introducing a mark into an optical element includes, for example, physically engraving a surface of the optical element, such as with a stylus. Chemical leeching can be used to introduce a mark, such as with optical elements fabricated from silica based glass. Lasers can also be used to introduce a mark into the surface of or within the body of an optical element. Present methods of introducing a mark into an optical element can result in the formation of marks that are undesirably observable, under some conditions, when the optical element is in normal use. For example, progressive ophthalmic lenses typically include one or more marks that can be used by an optician to properly and accurately fit the lenses on a person for whom the lenses have been prepared. Such marks can, in some instances, be visually observable to a wearer of the lenses, appearing, for example, as a small area of optical distortion in one or both of the lenses.

It would be desirable to develop new optical elements that include one or more marks that are substantially unobservable during normal use, and which can be rendered observable, such as briefly observable, under controllable conditions.

SUMMARY

In accordance with the present invention, there is provided an optical article comprising, (a) an optical substrate having a first surface and a second surface, wherein the first surface is exposed to a source of actinic radiation. The optical article further comprises, (b) a mark positioned on and/or within the first surface of the optical substrate, wherein the mark comprises at least one photoluminescent material. The optical article further comprises, (c) a photochromic layer comprising at least one photochromic compound, wherein the photochromic layer resides over at least a portion of the first surface of the optical substrate. The photochromic compound has an activation time, after exposure to the source of actinic radiation, and the mark luminesces and is visually observable during at least a portion of the activation time.

In accordance with the present invention, there is further provided an optical article comprising, (a) an optical substrate having a first surface and a second surface, wherein the first surface is exposed to a source of actinic radiation. The optical article further comprises, (b) a mark positioned within the first surface of the optical substrate, wherein the mark comprises at least one photoluminescent material. The optical article additionally comprises, (c) at least one photochromic compound positioned within the first surface of the optical substrate. The photochromic compound has an activation time, after exposure to the source of actinic radiation, and the mark luminesces and is visually observable during at least a portion of the activation time.

In accordance with the present invention, there is provided a method of preparing an optical, in which the method comprises: (a) providing an optical substrate having a first surface and a second surface; (b) forming a mark on and/or within the first surface of the optical substrate, wherein the mark comprises at least one photoluminescent material; and (c) forming, over at least a portion of the first surface of the optical substrate, a photochromic layer comprising at least one photochromic compound. The first surface of the optical substrate is exposed to a source of actinic radiation, the photochromic compound has an activation time, after exposure to the source of actinic radiation, and the mark luminesces and is visually observable during at least a portion of the activation time.

In accordance with the present invention, there is further provided a method of preparing an optical article, in which the method comprises: (a) providing an optical substrate having a first surface and a second surface; (b) forming a mark within the first surface of the optical substrate, wherein the mark comprises at least one photoluminescent material; and (c) introducing, within the first surface of the optical substrate, at least one photochromic compound. The first surface is exposed to a source of actinic radiation, the photochromic compound has an activation time, after exposure to the source of actinic radiation, and the mark luminesces and is visually observable during at least a portion of the activation time.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1(a) through 3(d) like characters refer to the same components and/or elements, as the case may be, unless otherwise stated.

DETAILED DESCRIPTION

Figure 1A:
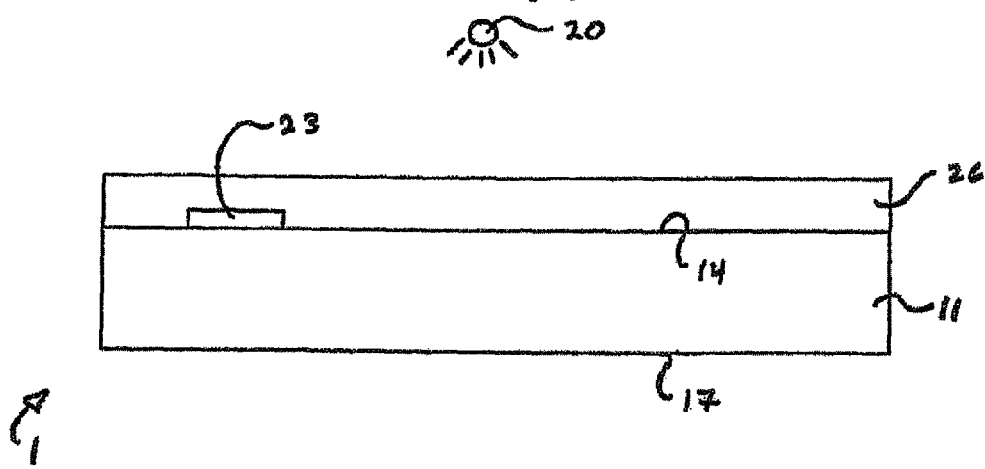
FIG. 1(a), FIG. 1(b), and FIG. 1(c) are representative sectional views of optical articles according to some embodiments of the present invention, in which the mark is positioned on and/or within the first surface of the optical substrate, and a photochromic layer resides over the first surface.

As used herein, the articles "a," "an," and "the" include plural referents unless otherwise expressly and unequivocally limited to one referent.

As used herein the term "a mark" means one or more marks.

Unless otherwise indicated, all ranges or ratios disclosed herein are to be understood to encompass any and all sub-ranges or sub-ratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein the term "optical" means pertaining to or associated with light and/or vision. For example, according to various non-limiting embodiments disclosed herein, the optical article, element, or device can be chosen from ophthalmic articles, elements, and devices, display articles, elements, and devices, windows, mirrors, and active and passive liquid crystal cell elements, articles and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, protective lenses, visors, sport masks, face shields, and goggles. A further non-limiting example of corrective and non-corrective lenses include fashion lenses.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display elements, articles and devices include screens, and monitors.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a flowable composition, which may or may not have a uniform thickness, and specifically excludes polymeric sheets.

As used herein the term "sheet" means a pre-formed film having a generally uniform thickness, which is capable of self-support.

As used herein the term "film" means a layer that is formed in-situ or preformed, and which is not capable of self-support.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (i.e., adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein to modify the term "state," the terms "first" and "second" are not intended to refer to any particular order or chronology, but instead refer to two different conditions or properties. For purposes of non-limiting illustration, the first state and the second state of a photochromic-dichroic compound of a photochromic-dichroic layer can differ with respect to at least one optical property, such as but not limited to the absorption or linearly polarization of visible and/or UV radiation. Thus, according to various non-limiting embodiments disclosed herein, the photochromic-dichroic compound of a photochromic-dichroic layer can have a different absorption spectrum in each of the first and second state. For example, while not limiting herein, the photochromic-dichroic compound of a photochromic-dichroic layer can be clear in the first state and colored in the second state. Alternatively, the photochromic-dichroic compound of a photochromic-dichroic layer can have a first color in the first state and a second color in the second state. Further, the photochromic-dichroic compound of a photochromic-dichroic layer can be non-linearly polarizing (or "non-polarizing") in the first state, and linearly polarizing in the second state.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

As used herein, the term "photoluminescent material" means materials that luminesce after exposure to actinic radiation, and which include, but are not limited to, fluorescent materials and/or phosphorescent materials.

In accordance with some embodiments of the present invention, the optical article includes, a mark that is positioned on and/or within the first surface of the optical substrate, and a photochromic layer (that includes at least one photochromic compound) which resides over at least a portion of the first surface of the optical substrate. For purposes of non-limiting illustration and with reference to FIG. 1(a) of the drawings, optical article 1 includes an optical substrate 11, which has a first surface 14 and a second surface 17. The first surface and the second surface of the optical substrate, with some embodiments, reside on substantially opposite sides of the optical substrate, such as depicted in the drawings. The first surface and the second surface of the optical substrate can, with some embodiments, each independently have any suitable shape selected from, but not limited to, planar shapes, curved shapes, concave shapes, convex shapes, polygonal shapes (such as, but not limited to, triangular shapes, rectangular shapes, pentagonal shapes, hexagonal shapes, heptagonal shapes, octagonal shapes, etc.), and combinations of two or more such non-limiting shapes.

The first surface of the optical substrate faces and is exposed to a source of actinic radiation. With reference to FIG. 1 (a), first surface 14 of optical substrate 11 faces and is exposed to a source of actinic radiation 20. The source of actinic radiation, with some embodiments, can be selected from a natural source of actinic radiation (such as, but not limited to, the sun), an artificial source of actinic radiation (such as, but not limited to, incandescent lights, halogen lights, fluorescent lights, ultraviolet lights, infrared lights, and combinations thereof), and combinations thereof. With some embodiments, the source of actinic radiation generates electromagnetic radiation selected from, infrared radiation (or light), visible light, ultraviolet light, and combinations of two or more thereof. In accordance with some embodiments, the actinic radiation includes ultraviolet light (or radiation).

The optical articles of the present invention, with some embodiments, include a mark that is positioned on and/or within the first surface of the optical substrate. As used herein the recitation of "within the first surface of the optical substrate" with regard to the mark means that at least a portion of the mark is positioned below the first surface. With some embodiments, the mark extends from the first surface to a depth below the first surface of the optical substrate.

Figure 1B:
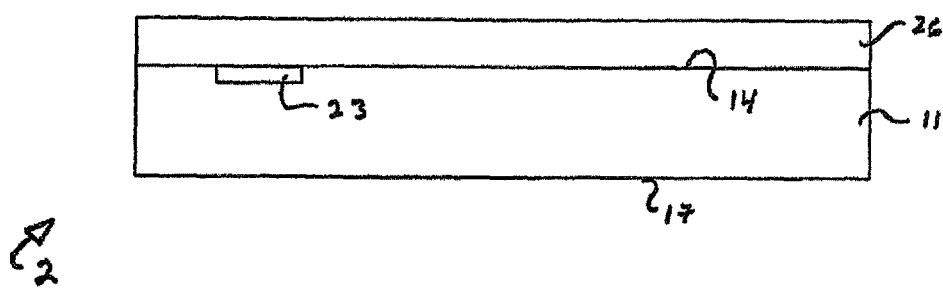
Figure 1C:
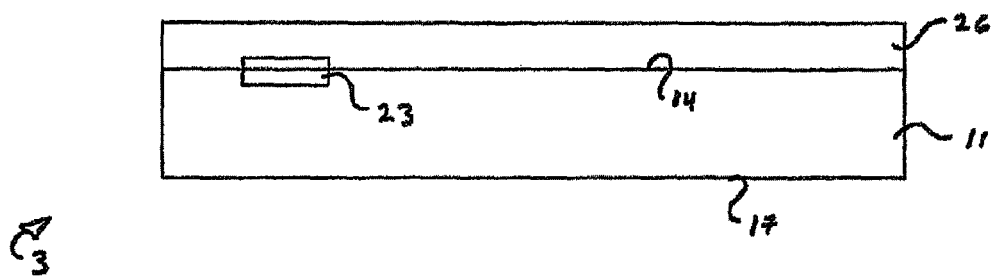

With reference to FIG. 1(a), optical article 1 includes a mark 23 that is positioned on first surface 14 of optical substrate 11. With reference to FIG. 1(b), optical article 2 includes a mark 23 that is positioned within first surface 14 of optical substrate 11. With reference to FIG. 1(c), optical article 3 includes a mark 23 that is positioned on and within first surface 14 of optical substrate 11.

With some further embodiments, the mark is positioned wholly below the first surface of the optical substrate, and does not extend from the first surface of the optical substrate.

Each mark of the optical articles of the present invention can, with some embodiments, have a form selected from indicia, patterns, images, designs, and combinations of two or more thereof. Examples of indicia include, but are not limited to, letters and numbers from one or more languages. With some embodiments, the mark is in the form of, or a plurality of marks that together define, a one-dimensional barcode and/or a two dimensional barcode.

The mark, with some embodiments, can be formed from a photoluminescent composition that includes one or more photoluminescent materials, a solvent and/or a polymer. With some embodiments, the photoluminescent material is present in the photoluminescent composition in an amount of from 0.1 percent by weight to 10 percent by weight, or from 0.5 percent by weight to 5 percent by weight, in each case based on the total weight of the photoluminescent composition. The solvent can, with some embodiments, be selected from water and/or one or more organic solvents, such as, but not limited to, alkanes, ethers, alcohols, ether-alcohols, aldehydes, ketones, carboxylic acid esters, aromatic solvents, and combinations of two or more thereof. Examples of polymers that can be included in the photoluminescent composition include, but are not limited to, poly(meth)acrylates, polyesters, polycarbonates, polyurethanes, polyethers, polyolefins, and combinations of two or more thereof. With some embodiments, the photoluminescent composition is in the form of a flowable liquid, a paste, or a flowable particulate composition.

The mark can be formed on and/or within the first surface of the optical substrate by suitable methods. Methods of forming the mark on and/or within the first surface of the optical substrate include, but are not limited to: printing methods, such as screen printing; masking methods; lamination methods; in-mold coating methods; transfer methods, such as transferring the mark from a transfer sheet or film to the first surface; imbibition methods; and combinations of two or more such methods.

The mark includes at least one photoluminescent material. With some embodiments the photoluminescent material is selected from one or more fluorescent materials and/or one or more phosphorescent materials. In accordance with some further embodiments, the photoluminescent material is selected from a fluorescent dye, a fluorescent pigment, a phosphorescent dye, a phosphorescent pigment, and combinations thereof. The fluorescent dyes, fluorescent pigments, phosphorescent dyes, and phosphorescent pigments can each independently be selected from art-recognized materials.

Examples of fluorescent dyes include, but are not limited to, xanthene based dyes, such as fluorescein, rhodamine, Oregon green, eosin, and Texas red; cyanine based dyes, such as cyanine, indocarbocyanine, oxacarbocyanine, thiacarbocyanine, and merocyanine; naphthalene based dyes; coumarin based dyes; oxadiazole based dyes, such as pyridyloxazole, nitrobenzoxadiazole and benzoxadiazole; anthracene based dyes; pyrene based dyes; oxazine based dyes, such as Nile red, Nile blue, cresyl violet, and oxazine 170; acridine based dyes, such as proflavin, acridine orange, and acridine yellow; arylmethine based dyes, such as auramine, crystal violet, and malachite green; and tetrapyrrole based dyes, such as porphin, phthalocyanine, and bilirubin.

With some embodiments, fluorescent pigments that can be used with the optical articles and methods of the present invention include, but are not limited to, one or more fluorescent dyes in combination with one or more polymers, the combination of which is solid at room temperature, and which has been ground into a powder. With some embodiments, one or more fluorescent dyes is melt blended with one or more polymers. The melt blended combination is solidified by cooling to room temperature, and then ground into a powder. The fluorescent dyes of the fluorescent pigments include, but are not limited to, those classes and examples of fluorescent dyes described previously herein. The polymers of the fluorescent pigments include, but are not limited to, poly(meth)acrylates, polyesters, polycarbonates, polyurethanes, polyethers, polyolefins, and combinations of two or more thereof.

Phosphorescent pigments that can be used with the optical articles and methods of the present invention include art-recognized phosphorescent pigments. With some embodiments, examples of phosphorescent pigments include, but are not limited to, zinc sulfide (ZnS), strontium aluminate ($SrAl_2O_4$), calcium sulfide (CaS), alkaline earth metal silicates, and combinations of two or more thereof. Phosphorescent dyes that can be used with the optical articles and methods of the present invention include art-recognized phosphorescent dyes, such as, but not limited to metallo-phosphors, such as transition metal phosphors that include, for example, Os, Ru, Ir, and/or Pt organo-complexes.

The optical articles of the present invention further include, with some embodiments, a photochromic layer that includes at least one photochromic compound. The photochromic layer resides over at least a portion of the first surface of the optical substrate, provided that at least a portion of the photochromic layer resides over the mark. The photochromic layer can be continuous or discontinuous, with some embodiments. The photochromic layer, with some embodiments, can be in the form of a pattern. With some embodiments, the photochromic layer is continuous and resides over substantially all of the first surface of the optical substrate.

With reference to FIG. 1(a), optical article 1 includes a photochromic layer 26 that resides over first surface 14 of optical substrate 11. As depicted in FIG. 1(a), and in accordance with some embodiments, photochromic layer 26 abuts first surface 14 of optical substrate 11. With some further embodiments, one or more other layers (such as, but not limited to, one or more primer layers as described further herein) can be interposed between first surface 14 and photochromic layer 26. Photochromic layer 26 can include a single layer or two or more layers (not shown). When composed of two or more layers, each layer of the photochromic layer can, with some embodiments, independently include one or more photochromic compounds that are the same or different.

The photochromic layer can have any suitable thickness. With some embodiments, the photochromic layer has a thickness of from 0.1 µm to 1000 µm, or from 10 µm to 50 µm, or from 15 µm to 30 µm.

The photochromic compound of the photochromic layer has an activation time after exposure to the source of actinic radiation. The mark luminesces and is visually observable during at least a portion of the activation time. With some embodiments, the activation time of the photochromic compound(s) of the photochromic layer is the amount of time after initial exposure to the source of actinic radiation that it takes for the photochromic compound(s) to reach full activation, which is measured, with some embodiments, as the maximum optical density of the photochromic compound(s). Without intending to be bound by any theory, it is believed that during the activation time of the photochromic compound(s) of the photochromic layer, at least a sufficient amount of actinic radiation reaches the mark, which results in luminescence of the photoluminescent material thereof. When the photochromic material has reached full activation, and in accordance with some embodiments, the amount of actinic radiation reaching the mark is reduced such that luminescence of the photoluminescent material thereof is minimized or not visually observable.

In accordance with some embodiments, when the photoluminescent material of the mark includes a phosphorescent material, the phosphorescent material (and correspondingly at least a portion of the mark) can phosphoresce for a period of time after the activation time of the photochromic material has been reached. In accordance with some further embodiments, when the photoluminescent material of the mark includes a fluorescent material, the fluorescent material (and correspondingly at least a portion of the mark) does not substantially fluoresce after the activation time of the photochromic material has been reached.

The activation time of the photochromic material can vary widely, depending on the type or types of photochromic materials that are present in the photochromic layer. With some embodiments, the activation time of the photochromic material of the photochromic layer is from 0.1 seconds to 200 seconds, or from 5 seconds to 100 seconds.

In accordance with some embodiments, during at least a portion of the activation time of the photochromic material of the photochromic layer: (i) the mark is visually observable when viewed from the second surface of the optical substrate; and (ii) the mark is substantially visually unobservable when viewed from the first surface of said optical substrate.

Figure 4A:
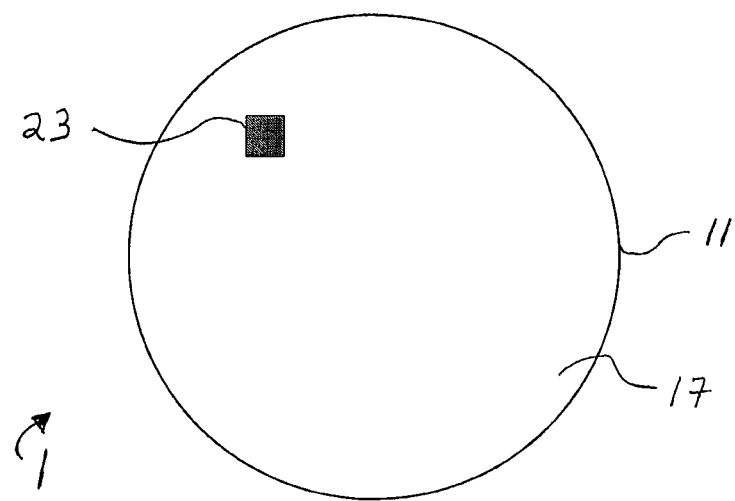
FIG. 4(a) is a representative plan view of the second surface of an optical article according to some embodiments of the present invention which is similar to that of FIG. 1(a), and in which the mark is visually observable during at least a portion of the activation time.

For purposes of non-limiting illustration and with reference to FIG. 4(a), a representative plan view of the second surface 17 of optical substrate 11 of optical article 1, according to some embodiments of the present invention, which is similar to that of FIG. 1(a) is depicted, in which mark 23 is visually observable during at least a portion of the activation time of the photochromic material of photochromic layer 26.

Figure 4B:
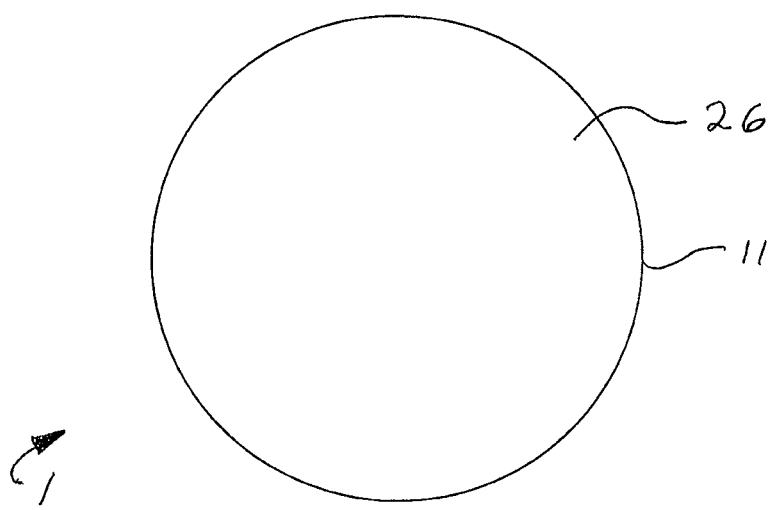
FIG. 4(b) is a representative plan view of the first surface of the optical article of FIG. 4(a), in accordance with some embodiments of the present invention, in which the mark is visually unobservable during at least a portion of the activation time.

For purposes of further non-limiting illustration and with reference to FIG. 4(b), a representative plan view relative to the first surface of optical substrate 11 of optical article 1 of FIG. 4(a), with photochromic layer 26 over first surface 14, is depicted, in which mark 23 is visually unobservable during at least a portion of the activation time of the photochromic material of photochromic layer 26.

With some embodiments, after the activation time of the photochromic material of the photochromic layer has been reached, the mark is substantially visually unobservable. The mark, with some embodiments, is substantially visually unobservable when viewed from the first surface and the second surface, after the activation time of the photochromic material of the photochromic layer has been reached.

In accordance with some embodiments: (i) the second surface of the optical substrate is free of photochromic material therein; and (ii) the second surface of the optical substrate is free of a layer including photochromic material thereover.

With some embodiments of the present invention: (i) the first surface of the optical substrate is defined by a first layer; (ii) the mark is positioned on and/or within the first layer; and (iii) the photochromic layer resides over at least a portion of the first layer, provided that at least a portion of the photochromic layer resides over the mark. For purposes of non-limiting illustration and with reference to FIG. 2(a), optical article 4 includes an optical substrate 11 that has a forward surface 32 and a second surface 17. Optical article 4, further includes a first layer 29 that resides over forward surface 32 and defines first surface 14 of optical substrate 11. Optical article 4 further includes a mark 23 that is positioned on first surface 14 (and correspondingly on first layer 29), and a photochromic layer 26 that resides over first surface 14 (and correspondingly over first layer 29).

Figure 2A:
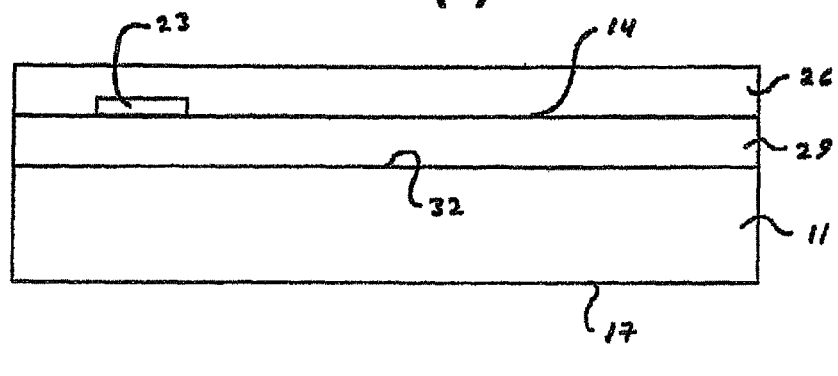
FIG. 2(a), FIG. 2(b), and FIG. 2(c) are representative sectional views of optical articles according to some embodiments of the present invention, in which the first surface of the optical substrate is defined by a first layer, a mark is positioned on and/or within the first surface, and a photochromic layer resides over the first surface.
Figure 2B:
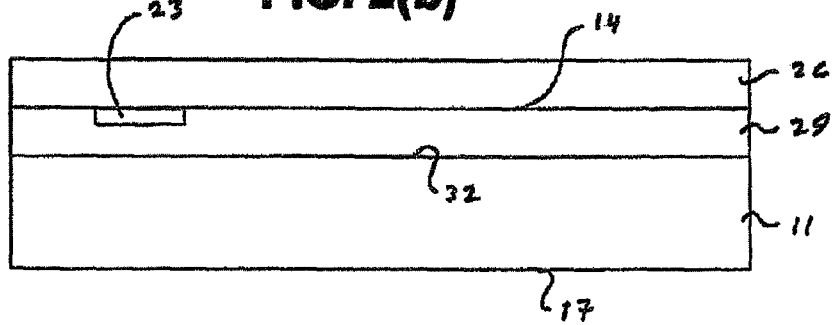
Figure 2C:
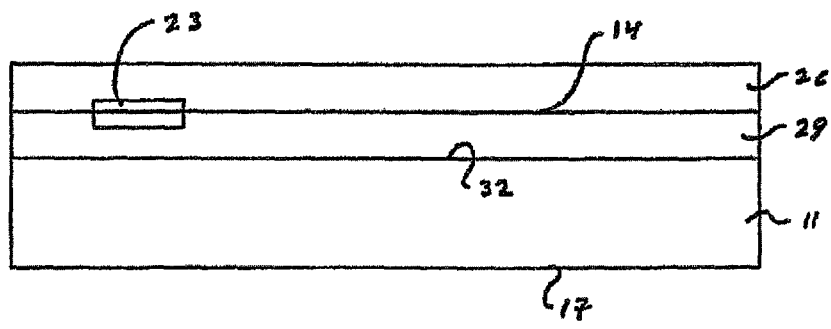

With reference to FIG. 2(b), mark 23 of optical article 5 resides within first surface 14 (and correspondingly within first layer 29). With reference to FIG. 2(c), mark 23 of optical article 6 resides on and within first surface 14 (and correspondingly on and within first layer 29).

In accordance with some embodiments of the optical article of the present invention, the optical substrate includes an optical material selected from an inorganic material, an organic material, and combinations thereof. Examples of inorganic materials from which the optical substrate can be fabricated include, but are not limited to, silicate based glass, such as soda-lime-silicate glass and/or borosilicate glass.

The optical substrate includes, with some embodiments, an organic material (or organic matrix). The organic material (or matrix) of the optical substrate includes, with some embodiments, one or more art-recognized oligomeric and/or polymeric organic materials from which optical lenses, such as ophthalmic lenses, are fabricated. In accordance with some embodiments, the optical substrate includes an organic material that includes, polycarbonate, poly(allyl-carbonate), polyurethane, polythiourethane, poly(urea-urethane), poly(meth)acrylate, polyolefin, polyvinyl, polyester, polyether, poly(siloxane), poly(silane), and combinations thereof. Additional and/or more specific examples of polymers that can be included in the organic matrix of the optical substrate include, but are not limited to: LEXAN thermoplastic polycarbonate; MYLAR polyester; PLEXIGLASS poly(methyl methacrylate); and TRIVEX poly(urea-urethane).

The optical substrate, with some embodiments, is formed from an art-recognized thermoplastic lens molding composition, or an art-recognized crosslinkable lens molding composition, and combinations thereof. Crosslinkable molding compositions are crosslinked to form a 3-dimensional cross-link network of covalent bonds. Crosslinking of the crosslinkable molding composition can be achieved by art-recognized methods including, but not limited to, exposure to elevated temperature, exposure to actinic light, allowing mixed reactive components to react with each other, and combinations thereof. Optical substrates that can be used with the optical articles of the present invention include, but are not limited to those described in U.S. Pat. No. 8,545,015 B2 at column 17, line 54 through column 19, line 23, which specific disclosure is incorporated herein by reference.

The optical substrate of the optical article, with some embodiments, can be prepared in accordance with art-recognized molding methods using art-recognized lens molding compositions, such as described in U.S. Pat. Nos. 4,279,401, 4,190,621, and 4,836,960.

Classes of photochromic compounds that can be present in the optical articles of the present invention (such as in the photochromic layer or within the first surface) include, but are not limited to, "conventional photochromic compounds." As used herein, the term "conventional photochromic compound" includes both thermally reversible and non-thermally reversible (or photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

The photochromic compound of the photochromic layer of the optical articles of the present invention can be selected from one or more art-recognized photochromic compounds. With some embodiments the photochromic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds, that can be present in the optical articles of the present invention, can, with some embodiments, be selected from certain indeno-fused napthopyran compounds, such as described in U.S. Pat. No. 6,296,785, at column 3, lines 66 through column 10, line 51, which disclosure is incorporated herein by reference.

The photochromic compounds that can be included in the optical articles of the present invention include, or can be, with some embodiments, photochromic-dichroic materials and compounds. The photochromic-dichroic materials and compounds can, with some embodiments, be selected from art-recognized photochromic-dichroic materials and compounds. Photochromic-dichroic compounds typically have a photochromic group (P) and at least one lengthening agent or group (L) covalently bonded to the photochromic group. The photochromic groups of the photochromic-dichroic compounds can be selected from those classes and examples as described previously herein with regard to the photochromic compounds, such as, but not limited to, pyrans, oxazines, fulgides, and indeno-fused naphthopyrans. Examples of photochromic-dichroic compounds that can be included in the optical articles of the present invention, include, but are not limited to those disclosed in U.S. Pat. No. 7,256,921 B2 at column 19, line 3 through column 22, line 46, which disclosure is incorporated herein by reference. Examples of lengthening groups (L) and photochromic groups (P) include, but are not limited to those disclosed in U.S. Pat. No. 7,256,921 B2 at column 22, line 47 through column 35, line 27, which disclosure is incorporated herein by reference. The photochromic compounds and/or photochromic-dichroic compounds can be present in the photochromic layer or within the first surface of the optical substrate, in amounts (or ratios) such that the optical article of the present invention exhibits desired optical properties. For purposes of non-limiting illustration, the amount and types of photochromic compounds and/or photochromic-dichroic compounds can be selected such that the optical article is clear or colorless when the photochromic compounds and/or photochromic-dichroic compounds are in the closed-form (e.g., in the bleached or unactivated state), and can exhibit a desired resultant color when the photochromic compounds and/or photochromic-dichroic compounds are in the open-form (e.g., when activated by actinic radiation). The precise amount of the photochromic compounds and/or photochromic-dichroic compounds that are utilized is not critical, provided that at least a sufficient amount is used to produce the desired effect. The particular amount of the photochromic compounds and/or photochromic-dichroic compounds used can depend on a variety of factors, such as but not limited to, the absorption characteristics of the photochromic compounds and/or photochromic-dichroic compounds, the color and intensity of the color desired upon activation, and the method used to incorporate the photochromic compounds and/or photochromic-dichroic compounds into a particular layer or substrate. Although not limiting herein, according to various non-limiting embodiments disclosed herein, the amount of the photochromic compounds and/or photochromic-dichroic compounds that are present in the photochromic layer of the optical article can range from 0.01 to 40 weight percent, or from 0.05 to 15, or from 0.1 to 5 weight percent, based on the weight of the photochromic layer. The same amounts and ranges are applicable with regard to the amount of the photochromic compounds and/or photochromic-dichroic compounds that are alternatively or additionally incorporated into the optical substrate of the optical articles of the present invention.

The photochromic compound(s) can be incorporated into the photochromic layer or the first surface of the optical substrate in accordance with art-recognized methods. With some embodiments, the photochromic compound(s) are incorporated into a previously formed film or sheet by art-recognized imbibition methods. Alternatively or additionally, and in accordance with some further embodiments, the photochromic compound(s) are incorporated into a composition from which the photochromic layer is formed. The photochromic compound(s), with some embodiments, can be incorporated into the first surface of the optical substrate in accordance with art-recognized imbibition methods.

The photochromic layer of the optical articles of the present invention can be formed by any suitable methods, such as but not limited to, lamination methods, coating methods, and in-mold methods. Coating methods include, for example, spray methods, dip coating methods, doctor (or draw-down) methods, spin coating methods, and curtain coating methods. With in-mold coating methods, a photochromic coating composition is applied to an interior surface of a mold, and the optical substrate is subsequently formed within the partially coated mold. With some further embodiments, a previously formed photochromic sheet or photochromic film is applied to an interior surface of a mold, and the optical substrate is subsequently formed within such mold.

The photochromic layer includes, with some embodiments a matrix material selected from thermoplastic polymer matrix materials, crosslinked polymer matrix materials, and combinations thereof. The polymer matrix materials can, with some embodiments, be selected from organic polymer matrix materials, inorganic polymer matrix materials, and combinations thereof. With some embodiments, the inorganic polymer matrix materials are selected from: polysilanes; polysiloxanes substituted with one or more of, alkoxy groups, aromatic oxy groups, alkyl groups, and aromatic groups; and combinations of two or more thereof. The inorganic polymer matrix materials can, with some embodiments, be thermoplastic inorganic polymer matrix materials and/or crosslinked inorganic polymer matrix materials.

With some embodiments, the matrix material of the photochromic layer includes one or more thermoplastic organic polymers. Examples of thermoplastic organic polymers include, but are not limited to, thermoplastic poly (meth)acrylates, thermoplastic polyethers, thermoplastic polythioethers, thermoplastic polyesters, thermoplastic polyamides, thermoplastic polyurethanes, thermoplastic polythiourethanes, thermoplastic polyvinyls, thermoplastic polyolefins and combinations thereof.

With some embodiments, the photochromic layer is formed from a curable photochromic composition, which after curing results in the formation of a photochromic layer that includes a crosslinked polymer matrix material. Curing of the curable photochromic composition can, with some embodiments be achieved by exposure to: ambient temperatures, such as in the case of two component compositions; elevated temperatures (e.g., 80° C. to 150° C. for 5 to 60 minutes), such as in the case of thermally cured coating compositions; or actinic radiation, such as in the case of ultraviolet light curable coating compositions.

In accordance with some embodiments, the photochromic layer includes a crosslinked organic polymer matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the crosslinked organic polymer matrix of the photochromic layer by free radical reactions or free radical polymerization, such as in the case of actinic radiation curable compositions. With some embodiments, the photochromic layer is formed from a curable composition. Examples of curable compositions from which the photochromic layer can be formed include, but are not limited to those described in U.S. 8,545,015 B2 at: column 43, line 38 through column 45, line 19; and column 48, line 1 through column 50, line 6, which specific disclosure of which is incorporated herein by reference.

The photochromic composition (and correspondingly the resulting photochromic layer) can further include at least one additive that, with some embodiments, is capable of facilitating one or more of the processing, the properties, or the performance of the photochromic composition and resulting photochromic layer. Non-limiting examples of such additives include static dyes, photoinitiators, thermal initiators, polymerization inhibitors, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of static dyes (i.e., tints or dyes that are not photochromic) that can be present in the photochromic composition and the resulting photochromic layer include, but are not limited to, art-recognized static organic dyes that are capable of imparting a desired color or other optical property to the photochromic layer. Examples of static dyes that can be present in the photochromic composition and photochromic layer include, but are not limited to, azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures and/or combinations thereof. Examples of anthraquinone dyes from which the fixed dye can be selected, with some embodiments, include but are not limited to, 1,4-dihydroxy-9, 10-antracenedione (CAS registry No. 81-64-1), 1,4-bis(4-methylphenyl)amino-9,10-anthracendione (CAS registry No. 128-80-3), 1,4-bis ((2-bromo-4,6-dimethylphenyl)amino)-9,10-anthracenedione (CAS registry No. 18038-98-8), and mixtures thereof.

Additional additives that can be present in the photochromic composition, from which the photochromic layer can be prepared, include hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

Additional additives that can be present in the photochromic composition include other adhesion enhancing ingredients. For example, although not limiting herein, the photochromic composition can further include an adhesion-enhancing amount of an epoxy-containing material. Adhesion-enhancing amounts of an epoxy-containing materials when included in the photochromic composition, can improve the adhesion of a subsequently applied coating or layer thereto. A class of an epoxy (or oxirane) functional adhesion promoters that can be included in photochromic composition include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

As described previously herein, and in accordance with some embodiments, the first surface of the optical substrate is defined by a first layer, such as, but not limited to, first layer 29 of FIGS. 2(a)-2(c). The first layer, with some embodiments, includes a matrix material selected from thermoplastic polymer matrix materials, crosslinked polymer matrix materials, and combinations thereof. The thermoplastic polymer matrix materials of the first layer, with some embodiments, are independently selected from those classes and examples of thermoplastic polymer matrix materials as described previously herein with regard to the photochromic layer. The crosslinked polymer matrix materials of the first layer, and compositions from which the crosslinked polymer matrix materials of the first layer can be prepared, with some embodiments, are independently selected from those classes and examples of crosslinked polymer matrix materials, and crosslinkable compositions as described previously herein with regard to the photochromic layer. The first layer and compositions from which the first layer can be prepared, can, with some embodiments, include one or more additives as described previously herein with regard to the photochromic layer and compositions from which the photochromic layer can be prepared.

The optical article, in accordance with some embodiments of the present invention, includes: (i) a mark residing within the first surface of the optical substrate, in which the mark includes at least one photoluminescent material; and (ii) at least one photochromic compound that also resides within the first surface of the optical substrate. For purposes of non-limiting illustration and with reference to FIG. 3(a), optical article 7 includes an optical substrate 11, which has a first surface 14 and a second surface 17, as described previously herein. Optical article 7 further includes a mark 23 that resides within first surface 14, and at least one photochromic compound that also resides within first surface 14, as generally indicated by character 35. For purposes of illustration, optical article 7 of FIG. 3(a) includes a dashed line 38 that is spaced from and positioned below first surface 14. The photochromic compound, with some embodiments, resides within a photochromic substrate layer 35 that is defined by first surface 14 and dashed line 38. Photochromic substrate layer 35 is part of optical substrate 11. With some embodiments, the photochromic compound is distributed throughout and across photochromic substrate layer 35. With some further embodiments, the photochromic compound is distributed substantially uniformly throughout and across photochromic substrate layer 35. The photochromic compounds within the first surface of the optical substrate can, with some embodiments, be selected from those classes and examples of photochromic compounds as described previously herein, such as with regard to the photochromic layer.

The photochromic compound(s) within photochromic substrate layer 35 has an activation time after exposure to a source of actinic radiation, and the mark 23 luminesces and is visually observable during at least a portion of the activation time, as described previously herein.

Figure 3A:
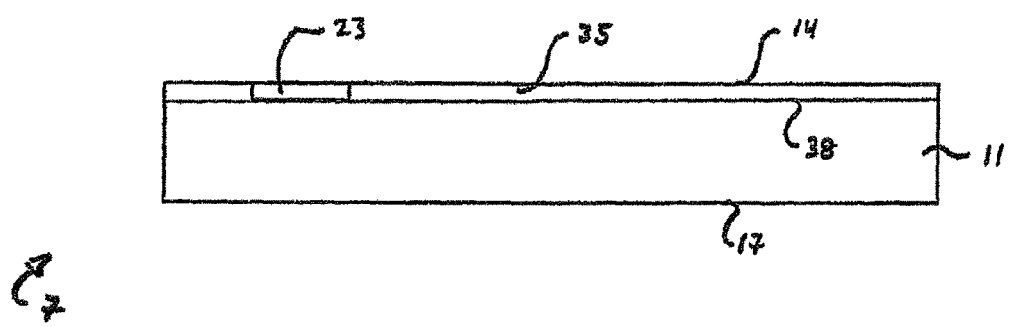
FIG. 3(a) is a representative sectional view of an optical article according to some embodiments of the present invention, in which a mark is positioned within a first surface of the optical substrate, and at least one photochromic compound is positioned within the first surface.
Figure 5A:
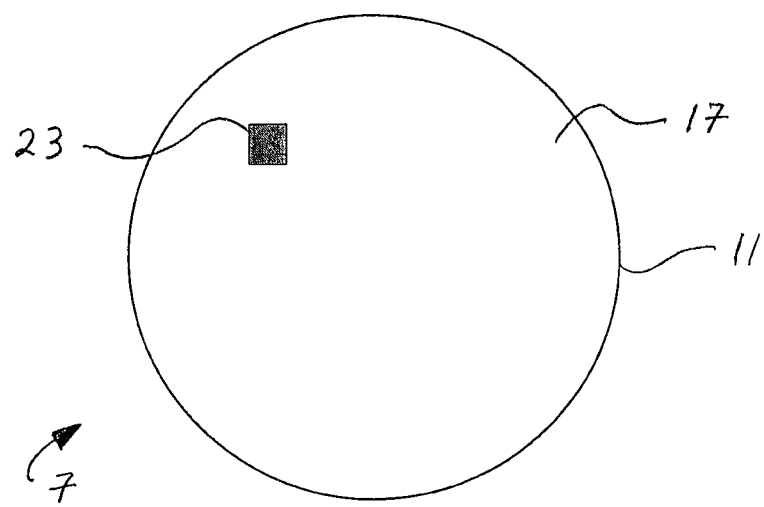
FIG. 5(a) is a representative plan view of the second surface of an optical article according to some embodiments of the present invention which is similar to that of FIG. 3(a), and in which the mark is visually observable during at least a portion of the activation time.

For purposes of non-limiting illustration and with reference to FIG. 5(a), a representative plan view of the second surface 17 of optical substrate 11 of optical article 7, according to some embodiments of the present invention, which is similar to that of FIG. 3(a) is depicted, in which mark 23 is visually observable during at least a portion of the activation time of the photochromic material within first surface 14.

Figure 5B:
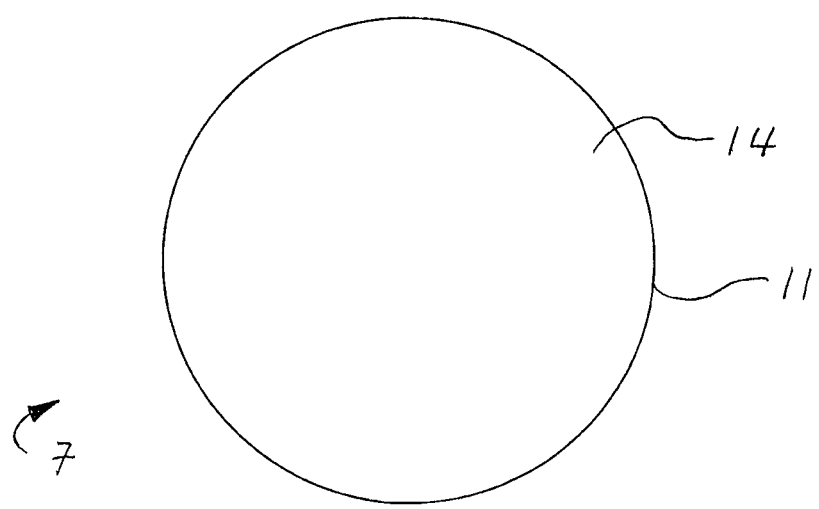
FIG. 5(b) is a representative plan view of the first surface of the optical article of FIG. 5(a), in accordance with some embodiments of the present invention, in which the mark is visually unobservable during at least a portion of the activation time.

For purposes of further non-limiting illustration and with reference to FIG. 5(b), a representative plan view of the first surface 14 of optical substrate 11 of optical article 7 of FIG. 5(a) is depicted, in which mark 23 is visually unobservable during at least a portion of the activation time of the photochromic material within first surface 14.

Without intending to be bound by any theory, it is believed that during the activation time of the photochromic compound(s) within the first surface of the optical substrate, at least a sufficient amount of actinic radiation reaches or otherwise activates the mark, which results in luminescence of the photoluminescent material thereof. When the photochromic material, within the first surface of the optical substrate, has reached full activation, and in accordance with some embodiments, the amount of actinic radiation reaching or otherwise activating the mark is reduced such that luminescence of the photoluminescent material thereof is minimized or not visually observable.

In accordance with some embodiments, and as described previously herein, during at least a portion of the activation time of the photochromic compound (such as residing within first surface 14 and photochromic substrate layer 35 of optical substrate 11): (i) the mark is visually observable when viewed from the second surface of the optical substrate; and (ii) the mark is substantially visually unobservable when viewed from the first surface of the optical substrate. With some further embodiments, after the activation time of the photochromic compound has been reached, the mark is substantially visually unobservable, whether viewed from the first surface or the second surface of the optical substrate.

In accordance with some embodiments, when the optical article includes both the mark and the photochromic compound within the first surface of the optical substrate: (i) the second surface of the optical substrate is free of one or more photochromic compounds therein; and (ii) the second surface of the optical substrate is free of a layer including one or more photochromic compounds thereover.

With some embodiments of the optical article of the present invention: (i) the first surface of the optical substrate is defined by a first layer; (ii) the mark is positioned within the first layer; and (iii) the photochromic material is also positioned within the first layer. For purposes of non-limiting illustration and with reference to FIG. 3(c) of the drawings, optical article 8 includes an optical substrate 11 that has a forward surface 32 and a second surface 17. Optical article 8, further includes a first layer 29 that resides over forward surface 32 and defines first surface 14 of optical substrate 11. Optical article 8 further includes a mark 23 that is positioned within first surface 14, and correspondingly within first layer 29. In addition, one or more photochromic compounds are also positioned within first surface 14, and correspondingly within first layer 29 of optical article 8.

In accordance with some embodiments, when the optical article includes both the mark and the photochromic compound within the first surface of the optical substrate: the optical article further includes a photochromic layer that includes at least one second photochromic compound, in which the photochromic layer resides over at least a portion of the first surface of the optical substrate. The photochromic layer can include a single layer or multiple layers in which each layer independently includes one or more second photochromic compound(s), which can be the same or different.

The second photochromic compound(s) of the photochromic layer can be the same or different than the photochromic compound(s) that reside within the first surface of the optical substrate. The second photochromic compound(s) can, with some embodiments, be selected from those classes and examples of photochromic compounds disclosed previously herein. The photochromic layer, which includes the second photochromic compound(s), can independently have a matrix and be formed as described previously herein with regard to the photochromic layer and the first layer, with some embodiments. The photochromic layer, which includes the second photochromic compound(s), can have any suitable thickness, such as from 0.1 µm to 1000 µm, or from 10 µm to 50 µm, or from 15 µm to 30 µm, with some embodiments.

Figure 3B:
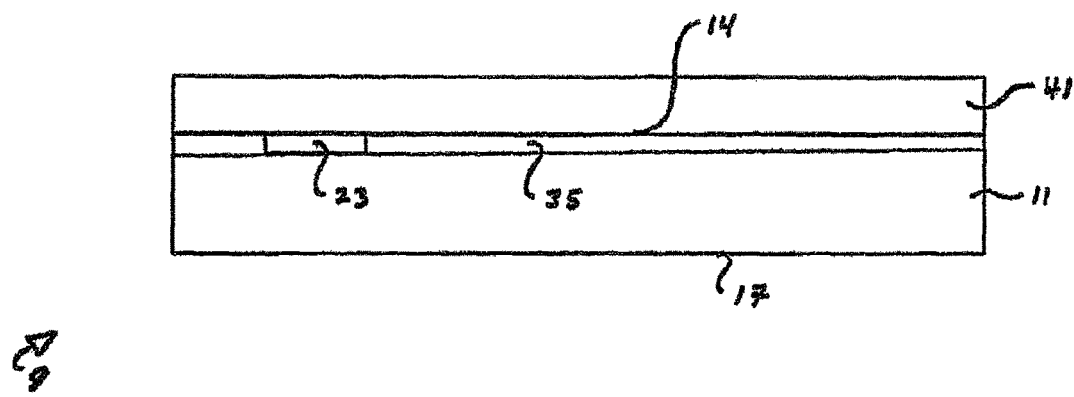
FIG. 3(b) is a representative sectional view of an optical article according to some embodiments of the present invention which is similar to that of FIG. 3(a), and which further includes a photochromic layer over the first surface.
Figure 3C:
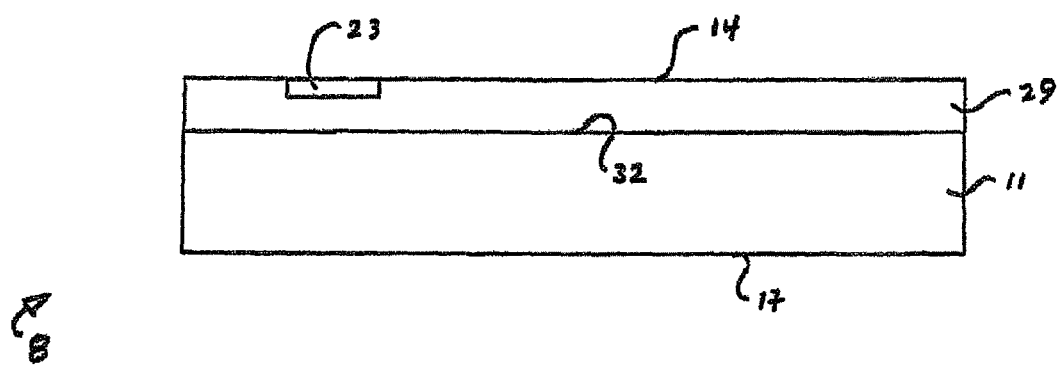
FIG. 3(c) is a representative sectional view of an optical article according to some embodiments of the present invention, in which the first surface of the optical substrate is defined by a first layer, a mark is positioned within the first surface, and at least one photochromic compound resides within the first surface.

For purposes of non-limiting illustration and with reference to FIG. 3(b) of the drawings, optical article 9 includes an optical substrate 11 having a first surface 14 a second surface 17, and a mark 23 that is positioned within first surface 14. With further reference to FIG. 3(b), optical article 9 further includes one or more photochromic compounds (such as one or more first photochromic compounds) that are also positioned within first surface 14 of optical substrate 11, such as being positioned within photochromic substrate layer 35, as described previously herein. Optical article 9 additionally includes a photochromic layer 41 that resides over first surface 14 of optical substrate 11. Photochromic layer 41 includes one or more second photochromic compounds.

Figure 3D:
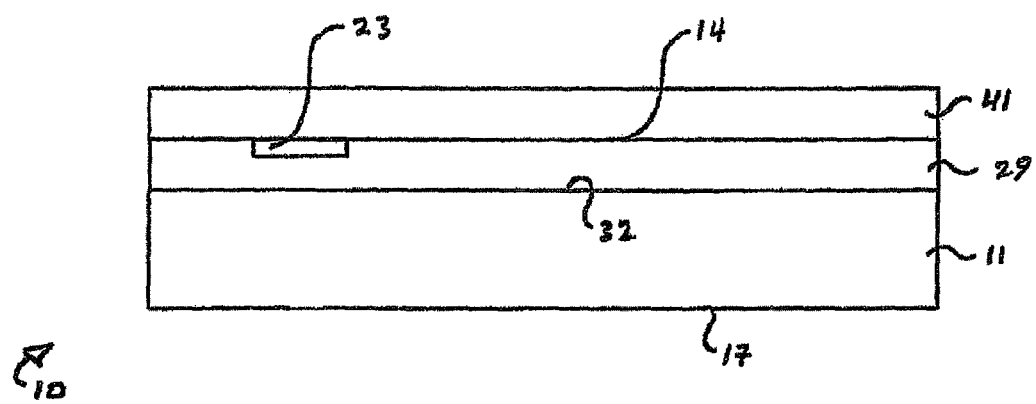
FIG. 3(d) is a representative sectional view of an optical article according to some embodiments of the present invention which is similar to that of FIG. 3(c), and which further includes a photochromic layer over the first surface.

With reference to FIG. 3(d) of the drawings, optical article 10 includes an optical substrate 11 that has a forward surface 32 and a second surface 17. Optical article 10, further includes a first layer 29 that resides over forward surface 32 and defines first surface 14 of optical substrate 11. Optical article 10 further includes a mark 23 that is positioned within first surface 14, and correspondingly within first layer 29. In addition, one or more photochromic compounds are also positioned within first surface 14, and correspondingly within first layer 29 of optical article 10. Optical article 10 of FIG. 3(d) further includes a photochromic layer 41 that resides over first surface 14 (and correspondingly over first layer 29) of optical substrate 11. Photochromic layer 41 includes one or more second photochromic compounds.

The optical articles of the present invention, with some embodiments, can include one or more further layers, in addition to those layers described previously herein, such as the photochromic layer(s) and the first layer. Each further layer is independently selected from, with some embodiments, primer layers, protective layers, anti-reflective layers, polarizing layers, and combinations thereof. Each further layer can, with some embodiments, be independently positioned over the first surface and/or the second surface of optical substrate. When positioned over the first surface of the optical substrate, each further layer can be independently positioned over and/or under the photochromic layer and/or the first layer. Each further layer can, with some embodiments, be independently formed from a coating composition. The matrix of each further layer, and compositions from which each further layer can be formed, include but are not limited to those matrices and compositions as described previously herein with regard to the photochromic layer.

The optional protective layer is, with some embodiments, selected from an abrasion-resistant coating, such as a "hard coat." The optional protective layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134, 191, 5,231,156 and International Patent Publication WO 94/20581 for disclosures of organo-silane hard coatings, which disclosures are also incorporated herein by reference.

The optional anti-reflective layer can be selected from art-recognized anti-reflective layers, and typically includes at least two layers each having a different refractive index. Examples of anti-reflective layers from which the optional anti-reflective layer can be selected are described in U.S. Pat. No. 6,175,450,B1 at column 1, line 56 through column 2, line 7; column 2, lines 50-65; and column 5, lines 22-58, which disclosure is incorporated herein by reference.

Each optional polarizing layer can, with some embodiments, be selected from art-recognized polarizing layers. With some embodiments, each optional polarizing layer is a conventional linearly polarizing layer formed from one or more layers of unilaterally stretched polymer films, such as unilaterally stretched polyvinyl alcohol films, optionally containing a dichroic material.

In accordance with further embodiments of the present invention, the optical articles of the present invention can be selected from ophthalmic articles or elements, display articles or elements, windows, mirrors, active liquid crystal cell articles or elements, and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the optical article can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned non-limiting embodiments can further include one or more other coatings or films or sheets to form a multi-layer reflective security element with viewing angle dependent characteristics, such as described in U.S. Pat. No. 6,641,874.

The present invention also relates to a method preparing an optical article, in which a mark resides on and/or within the first surface of the optical substrate thereof, and a photochromic layer resides over the first surface. The method of preparing such an optical article includes: (a) providing an optical substrate having a first surface and a second surface; (b) forming a mark on and/or within the first surface of the optical substrate, in which the mark includes at least one photoluminescent material; and (c) forming, over at least a portion of the first surface of the optical substrate, a photochromic layer that includes at least one photochromic compound. With the optical article so formed, the first surface of said optical substrate is exposed to a source of actinic radiation, the photochromic compound has an activation time after exposure to the source of actinic radiation, and the mark luminesces and is visually observable during at least a portion of the activation time. The optical substrate can, with some embodiments, be formed in accordance with those methods and from those compositions as described previously herein. The mark, with some embodiments, can be formed on and/or within the first surface of the optical substrate in accordance with those methods and from those compositions as described previously herein. The photochromic layer, with some embodiments, can be formed over at least a portion of the first surface of the optical substrate in accordance with those methods and from those compositions as described previously herein. With some embodiments, the photochromic layer is formed so as to at least reside or be positioned over the mark.

The present invention also relates to a method preparing an optical article, in which a mark is positioned within the first surface of the optical substrate thereof, and one or more photochromic compounds are also positioned within the first surface of the optical substrate. The method of preparing such an optical article includes: (a) providing an optical substrate having a first surface and a second surface; (b) forming a mark within the first surface of the optical substrate, in which the mark includes at least one photoluminescent material; and (c) introducing, within the first surface of the optical substrate, at least one photochromic compound. With the optical article so formed, the first surface is exposed to a source of actinic radiation, the photochromic compound has an activation time after exposure to the source of actinic radiation, and the mark luminesces and is visually observable during at least a portion of the activation time. The optical substrate can, with some embodiments, be formed in accordance with those methods and from those compositions as described previously herein. The mark, with some embodiments, can be formed within the first surface of the optical substrate in accordance with those methods and from those compositions as described previously herein. The photochromic compound(s), with some embodiments, can be introduced into the first surface of the optical substrate in accordance with those methods and from those compositions as described previously herein.

With some embodiments, the step of forming the mark within the first surface of the optical substrate is performed before the step of introducing at least one photochromic compound within the first surface of the optical substrate. With some further embodiments, the step of introducing at least one photochromic compound within the first surface of the optical substrate is performed before the step of forming the mark within the first surface of the optical substrate. In accordance with some additional embodiments, the step of forming the mark within the first surface of the optical substrate and the step of introducing at least one photochromic compound within the first surface of the optical substrate, are both performed at least partially concurrently.

The present invention has been described with reference to specific details of particular embodiments thereof. It is not intended that such details be regarded as limitations upon the scope of the invention except insofar as to the extent that they are included in the accompanying claims.

What is claimed is:

1. An optical article comprising:
   (a) an optical substrate having a first surface and a second surface, wherein said first surface is exposed to a source of actinic radiation;
   (b) a mark positioned at least one of on and within said first surface of said optical substrate, wherein said mark comprises at least one photoluminescent material; and
   (c) a photochromic layer comprising at least one photochromic compound, wherein said photochromic layer resides over at least a portion of said first surface of said optical substrate,
   wherein said photochromic compound has an activation time after exposure to said source of actinic radiation, and said mark luminesces and is visually observable during at least a portion of said activation time, and
   wherein during at least a portion of said activation time,
      said mark is visually observable when viewed from said second surface of said optical substrate, and
      said mark is substantially visually unobservable when viewed from said first surface of said optical substrate.

2. The optical article of claim 1, wherein after said activation time, said mark is substantially visually unobservable.

3. The optical article of claim 1, wherein said source of actinic radiation comprises ultraviolet light.

4. The optical article of claim 1, wherein said second surface of said optical substrate is free of photochromic material therein, and said second surface of said optical substrate is free of a layer comprising photochromic material thereover.

5. The optical article of claim 1, wherein said mark resides within said first surface of said optical substrate.

6. The optical article of claim 1, wherein said optical substrate comprises an optical material selected from an inorganic material, an organic material, and combinations thereof.

7. The optical article of claim 1 wherein,
   said first surface of said optical substrate is defined by a first layer,
   said mark resides at least one of on and within said first layer, and
   said photochromic layer resides over at least a portion of said first layer.

8. The optical article of claim 7, wherein said first layer comprises a matrix material selected from thermoplastic polymer matrix materials, crosslinked polymer matrix materials, and combinations thereof.

9. The optical article of claim 1, wherein said photochromic layer comprises a matrix material selected from thermoplastic polymer matrix materials, crosslinked polymer matrix materials, and combinations thereof.

10. The optical article of claim 1, wherein said photochromic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

11. The optical article of claim 1, wherein said photoluminescent material is selected from a fluorescent dye, a fluorescent pigment, a phosphorescent dye, a phosphorescent pigment, and combinations thereof.

12. The optical article of claim 1 wherein said optical article is selected from ophthalmic articles, display articles, windows, mirrors, and active liquid crystal cells, and passive liquid crystal cells.

13. The optical article of claim 12 wherein said optical article is selected from ophthalmic articles, and said ophthalmic articles are selected from corrective lenses, non-corrective lenses, contact lenses, intra-ocular lenses, magnifying lenses, protective lenses, visors, sport masks, face shields, and goggles.

14. An optical article comprising:
(a) an optical substrate having a first surface and a second surface, wherein said first surface is exposed to a source of actinic radiation;
(b) a mark positioned within said first surface of said optical substrate, wherein said mark comprises at least one photoluminescent material; and
(c) at least one photochromic compound positioned within said first surface of said optical substrate,
wherein said photochromic compound has an activation time after exposure to said source of actinic radiation, and said mark luminesces and is visually observable during at least a portion of said activation time, and
wherein during at least a portion of said activation time, said mark is visually observable when viewed from said second surface of said optical substrate, and said mark is substantially visually unobservable when viewed from said first surface of said optical substrate.

15. The optical article of claim 14, wherein after said activation time, said mark is substantially visually unobservable.

16. The optical article of claim 14 wherein,
said optical substrate comprises an optical material selected from an inorganic material, an organic material, and combinations thereof,
said photochromic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof,
said photoluminescent material is selected from a fluorescent dye, a fluorescent pigment, phosphorescent dye, phosphorescent pigment, and combinations thereof, and
said actinic radiation comprises ultraviolet light.

17. The optical article of claim 14 wherein,
said first surface of said optical substrate is defined by a first layer,
said mark resides within said first layer, and
said photochromic compound resides within said first layer,
wherein said first layer comprises a matrix material selected from thermoplastic polymer matrix materials, crosslinked polymer matrix materials, and combinations thereof.

18. The optical article of claim 14 further comprising a photochromic layer comprising at least one second photochromic compound, wherein said photochromic layer resides over said first surface of said optical substrate.

19. A method of preparing an optical article comprising:
(a) providing an optical substrate having a first surface and a second surface;
(b) forming a mark at least one of on and within said first surface of said optical substrate, wherein said mark comprises at least one photoluminescent material; and
(c) forming, over at least a portion of said first surface of said optical substrate, a photochromic layer comprising at least one photochromic compound,
wherein said first surface of said optical substrate is exposed to a source of actinic radiation, said photochromic compound has an activation time after exposure to said source of actinic radiation, and said mark luminesces and is visually observable during at least a portion of said activation time, and
wherein during at least a portion of said activation time, said mark is visually observable when viewed from said second surface of said optical substrate, and said mark is substantially visually unobservable when viewed from said first surface of said optical substrate.

20. A method of preparing an optical article comprising:
(a) providing an optical substrate having a first surface and a second surface;
(b) forming a mark within said first surface of said optical substrate, wherein said mark comprises at least one photoluminescent material; and
(c) introducing, within said first surface of said optical substrate, at least one photochromic compound,
wherein said first surface is exposed to a source of actinic radiation, said photochromic compound has an activation time after exposure to said source of actinic radiation, and said mark luminesces and is visually observable during at least a portion of said activation time, and
wherein during at least a portion of said activation time, said mark is visually observable when viewed from said second surface of said optical substrate, and said mark is substantially visually unobservable when viewed from said first surface of said optical substrate.

\* \* \* \* \*